United States Patent [19]
Dowell et al.

[11] 3,983,974
[45] Oct. 5, 1976

[54] AIR COOLED DISC BRAKE

[75] Inventors: Frederick Sidney Dowell; Benedict Pascal Healy, both of Coventry, England

[73] Assignee: Dunlop Limited, London, England

[22] Filed: Feb. 7, 1975

[21] Appl. No.: 547,930

[30] Foreign Application Priority Data
Feb. 8, 1974 United Kingdom............... 5792/74

[52] U.S. Cl. ..................... 188/264 AA; 188/71.6
[51] Int. Cl.² ................................ F16D 65/847
[58] Field of Search............ 188/71.5, 71.6, 264 A, 188/264 AA, 264 G; 192/113 A

[56] References Cited
UNITED STATES PATENTS

| | | | |
|---|---|---|---|
| 2,869,659 | 1/1959 | Mayo............................ | 192/113 A |
| 3,061,050 | 10/1962 | Van Horn...................... | 188/71.5 |
| 3,251,437 | 5/1966 | Moyer et al.................... | 188/264 AA |
| 3,754,624 | 8/1973 | Eldred.......................... | 188/71.5 |
| 3,887,041 | 6/1975 | Malone......................... | 188/71.5 |
| 3,892,293 | 7/1975 | Dowell......................... | 188/71.5 |

Primary Examiner—Trygve M. Blix
Assistant Examiner—Edward R. Kazenske
Attorney, Agent, or Firm—Stevens, Davis, Miller & Mosher

[57] ABSTRACT

In an aircraft wheel and disc brake assembly wherein carbon rotor discs keyed to the wheel are interleaved with carbon stator discs keyed to a torque tube fixed to the axle and in which a fixed draught of air is passed through and around the disc pack, the consequential increase in oxidation of the carbon discs is obviated or minimized by the employment of heat shield members between the keys of the torque tube and the wheel rim which define passages for the flow of cooling air isolated from the disc pack. The keys of the torque tube may be hollow and may be formed with apertures whereby the interior communicates with the passages so that cooling air also passes through the interior of the torque tube keys.

9 Claims, 9 Drawing Figures

AIR COOLED DISC BRAKE

This invention relates to multi disc brakes comprising a number of annular non-rotatable or stator discs interleaved with a number of annular rotatable or rotor discs and a brake-applying mechanism arranged axially to displace the rotor and stator discs into frictional engagement.

With the ever-increasing performance and carrying capacity of modern aircraft the demands imposed on aircraft wheel brakes are also continually increasing. In an attempt to meet this increased braking performance demand brake designers have found it necessary to turn to new friction materials which are capable of maintaining the required value of friction co-efficient at the high operating temperatures of the order of 1000° C., now encountered in aircraft disc brakes.

A material currently in favor with aircraft disc brake designers, on account of its good frictional properties and high specific heat, is carbon, which, if the operating conditions demand, may be reinforced with filamentary carbon in the form of carbonized cloth or tape or the like or any other suitable reinforcement.

One of the problems associated with the use of carbon is that the high operating temperatures now encountered in aircraft disc brakes any area of the carbon friction material which is exposed to the atmosphere tends to oxidize.

It is accordingly an object of the present invention to provide heat shield means which serves additionally for protecting the disc pack from ambient air.

In U.S. Pat. No. 3,734,247, there is described means for creating a forced air flow past the inner and outer peripheries of the disc pack for cooling purposes. However it is the inner and outer peripheries of the discs which are most exposed to atmosphere and most vulnerable to undesirable oxidation. Oxidation will be increased in the presence of a forced draught and it is therefore desirable as far as possible to protect these exposed portions of the discs from the forced draught. This is especially necessary at the inner peripheries of the discs, where heat generated when the brake is applied is retained longest.

Accordingly it is yet another object of the invention to provide a heat shield means which serves wholly or partially to isolate the disc pack from a forced draught of cooling air produced by means such as disclosed in U.S. Pat. No. 3,734,247.

According to the present invention there is provided a wheel and disc brake assembly including a wheel rotatably mounted on an axle, a torque tube fixed relative to the axle and having a plurality of keys or tenons extending longitudinally of the tube in circumferentially spaced relation, a plurality of interleaved annular stator and rotor discs of which the stators discs engage the keys of the torque tube at their inner peripheries to be axially displaceable but non-rotatable relative to the torque tube and the rotor discs are keyed to the wheel to be rotatable therewith but axially displaceable relative thereto, reaction means being provided at one end of the disc pack and thrust applying means at the other end of the disc pack whereby the discs may be axially displaced into frictional engagement to apply the brake, wherein heat shield means is provided extending between each adjacent pair of keys or tenons of the torque tube between the radially inner periphery of the disc pack and the torque tube and in spaced relation to the latter, said heat shield means extending longitudinally of the torque tube into contact with a fixed mounting for the thrust-applying means at one end and with the reaction means at its other end to form therewith an air passage between each adjacent pair of keys or tenons of the torque tube which is isolated from the disc pack and through which a forced draught of cooling air can be passed to remove heat radiated to the heat shield means from the disc pack, the said mounting for the thrust-applying means and the torque tube or reaction means being suitably apertured near to the opposite ends of each said passage for the entry and exit of the cooling air.

The heat shield means is in sheet form, preferably of metal but may be made of other heat resisting material such as ceramic or carbon fibre-reinforced carbon.

Additionally each key or tenon of the torque tube is hollow and has bores penetrating its lateral sides for the entry of cooling air from said passages, the torque tube having apertures at its end nearest the reaction flange which respectively communicate with the keys or tenons for the exit of cooling air therefrom.

The disc portion of the wheel preferably has angularly spaced apertures through which negative air pressure may be applied by means such as described in U.S. Pat. No. 3,734,247 to produce a forced draught of cooling air both between the inner periphery of the disc pack and the torque tube and between the outer periphery of the disc pack and the wheel rim. In this case it is especially desirable to provide sheet metal heat shield members extending between the keys of tenons of the wheel rim between the outer periphery of the disc pack and the wheel rim and in spaced relation to the latter to protect the wheel rim from heat radiated by the disc pack and provide passages for cooling air which are separated from the disc pack. Barrier means is preferably provided at the cooling air entry end of the assembly to reduce the amount of indrawn cooling air which would otherwise pass between the outer periphery of the disc pack and the associated heat shield means and cause at least most of the air to pass between the latter means and the wheel rim.

Several embodiments of the present invention will now be described by way of example with reference to the accompanying drawings, in which.

Figure 1:
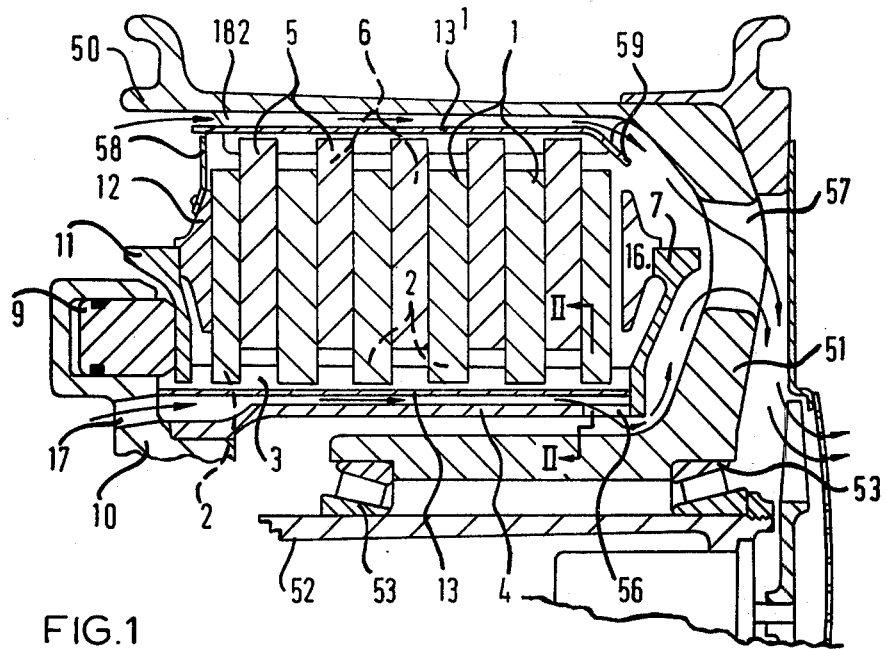
FIG. 1 shows a half radial section through an aircraft multi-plate wheel disc brake in accordance with the present invention.

The brake basically comprises a disc pack including a number of annular carbon stator discs 1 reinforced with laminations of carbonized cloth and interleaved between a number of annular carbon rotor discs 5 which are also similarly reinforced. The inner peripheries of the stators are arranged to extend radially inwardly beyond the inner peripheries of the rotors and are provided with a number of circumferentially-spaced torque-transmitting keyways 2 (see FIG. 2) which slidably engage corresponding circumferentially-spaced keys 3 formed on a non-rotatable torque tube 4.

The outer peripheries of the rotors are conversely arranged to extend radially outwardly beyond the outer peripheries of the stators and are provided with a number of circumferentially-spaced torque-transmitting keyways 6 which slidably engage corresponding circumferentially-spaced metal keys 182 provided on the associated wheel rim 50 extending from wheel disc portion 51 which is rotatably mounted on wheel axle 52 by bearings 53.

A reaction flange 7, which supports a reaction plate 16, is secured to the axially outer end of the torque tube 4 and a number of circumferentially-spaced hydraulic brake-applying piston and cylinder assemblies 9 are provided in a torque plate assembly 10 which supports torque tube 4. The axial brake-applying thrust from the piston and cylinder assemblies is transmitted to the disc pack of rotors and stators via thrust transmitting rings 11 and 12 which uniformly distribute the thrust in the manner described in U.S. Pat. No. 3,653,472.

In order to reduce the heat transfer from the stators to the torque tube and hence to the rest of the brake, the inner peripheries 54 of the stators between the keyways 2 are spaced from the torque tube 4 and sheet metal heat shields 13 are provided on the torque tube 4 between the keys 3. The sides of the heat shields are engaged in lateral notches 55 in the keys 3 and thus are spaced from the torque tube.

In accordance with this embodiment of the present invention, the torque plate assembly 10 is formed with a plurality of circumferentially spaced bores 17, each opening inwardly of the assembly between the adjacent keys 3 of the tube 4. Each heat shield 13 abuts the torque plate 10 at one end and the reaction flange 17 at its other end thus isolating the associated bore 17 from the disc pack 1,5.

The torque tube 4 is provided at its end locating the reaction flange 7 with a plurality of circumferentially spaced apertures 56. The diaphragm portion 51 of the wheel is also formed with a plurality of circumferentially spaced apertures 57 and there is associated with the central part of the wheel on the side thereof remote from the disc pack means for generating a forced draught of cooling air, such as that described in U.S. Pat. No. 3,734,247, whereby a forced draught of air is caused to follow the path indicated by the arrows in FIG. 1 entering through the aperture 17, passing between the shields 13 and torque tube 4 and exiting through the apertures 56. This forced draught is effective to cool the heat sink of the brake, but is isolated from the disc pack which is highly desirable if the stators and rotors are of a material subject to oxidation, such as structural carbon.

Heat shield members 13' extend between notches in the keys 182 of the wheel rim 50 to provide similar cooling air passages at the radially outer periphery of the disc pack. An annular shield member 58 is fixed to the thrust transmitting ring 12 and extends radially outwardly therefrom into close proximity with the ends of the heat shields 13' nearest the piston-and-cylinder assemblies 9,10 and this serves as a barrier to indrawn air reaching the outer periphery of the disc pack. At least most of the indrawn air at the outer periphery of the disc pack therefore follows the path indicated by the arrows and flows between the shields 13' and the rim 50. At its end nearest the diaphragm portion 51 of the wheel each shield member 13' is bent downward at 59 over the inner end of the disc pack, thus protecting the latter from oxidation due to the draught of cooling air which passes from between the shield members 13' and rim 50 to the apertures 57 in the wheel disc portion.

Figure 2:
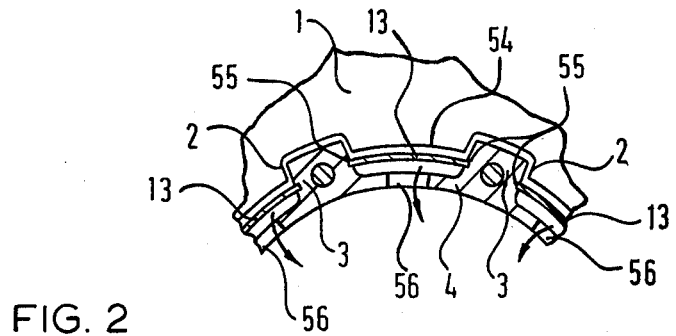
FIG. 2 illustrates a detail of the assembly of FIG. 1, the view being taken on the line II—II of FIG. 1.
Figure 3:
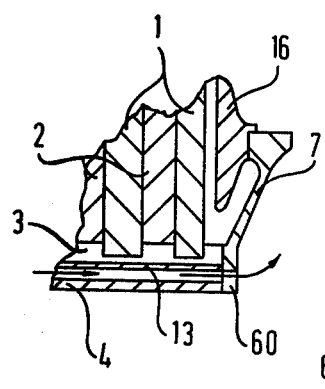
FIG. 3 is a detail view similar to FIG. 1 of a modified brake.
Figure 4:
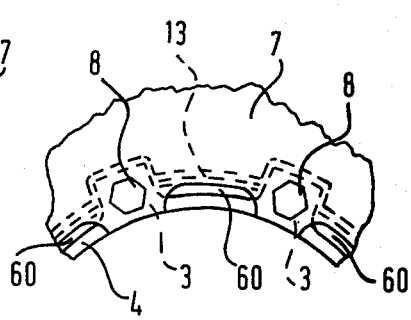
FIG. 4 is an end view of the brake of FIG. 3.

FIGS. 3 and 4 illustrate a modification of the arrangement of FIGS. 1 and 2, wherein the apertures 56 in the torque tube 4 are omitted. To allow air to flow from between each shield member 13 and the torque tube 4 to the apertures 57 in the wheel disc the inner periphery of the reaction flange 7 is cut away to provide a plurality of recesses 60, one aligned with each passage between two adjacent keys 3, which are deep enough radially of the reaction flange 7 to define openings with the tube 4 through which air can exit from the passages. Bolts 8 penetrate the projections on the inner periphery of the reaction flange 7 between adjacent recesses 60 respectively to engage the keys 3 and thus secure the reaction flange to the torque tube, as shown in FIG. 4 which is a view of the right-hand end of the assembly of FIG. 3.

It will be seen that the shield members 13 and 13' which are of sheet metal, not only isolate the forced draught of cooling air from the pack of discs 1,5, to avoid increased oxidation of the inner peripheries of the discs by the forced draught, but also protect the torque tube 4 from heat radiated by the discs. Heat absorbed by the shield members 13 and 13' is transferred to air drawn through the bores 17, which prevents overheating of the shields.

Figure 5:
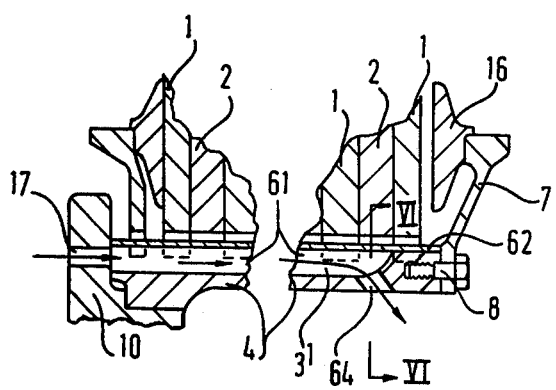
FIG. 5 is a radial section of yet another brake, the view being taken in a plane which contains the axis of the brake and intersects one of the keys of the torque tube.
Figure 6:
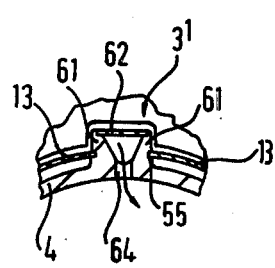
FIG. 6 is a cross-section on the line VI—VI of FIG. 5.

In the modification of the invention illustrated in FIGS. 5 and 6 each key 3' of the torque tube 4 is hollow and is constituted by a pair of circumferentially-spaced longitudinal ribs 61 projecting radially from the torque tube 4. The two ribs 61 of each key 3' are bridged by a metal plate 62 which isolates the interior of the key from the disc pack.

Bores 17 are provided in the torque plate 10 which respectively communicate with the interior of the hollow keys 3'. Due to the air pressure drop from one end of the torque tube to the other in the direction from the torque plate 10 to the reaction flange 7 created by the air extraction means (not shown) air is drawn continuously through the length of each key 3' entering at bores 17 and exiting at bores 64, thereby removing heat from the keys.

Figure 7:
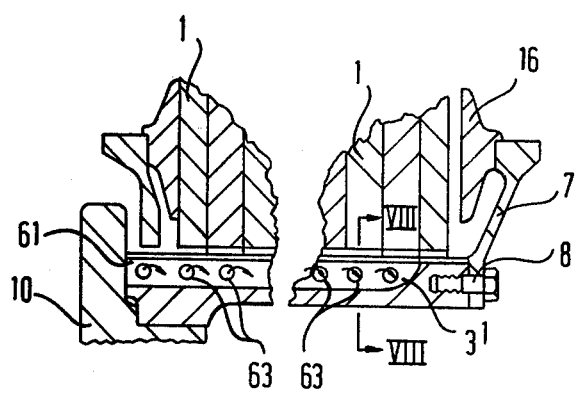
FIG. 7 and 8 are views similar to FIG. 5 and 6, respectively, of another modification.
Figure 8:
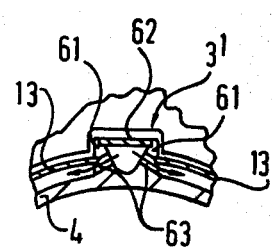

FIGS. 7 and 8 illustrate an alternative arrangement for cooling the hollow torque tube keys 3'. The ribs 61 which constitute the torque tube keys are provided with bores 63 which communicate the interior of each key with the spaces between the keys underneath the heat shield members 13. If desired a plurality of bores 63 can be provided in each rib of each key 3' at spaced intervals along the length thereof, or one or more bores may be provided at each end adjacent to each end of each key.

Due to the air pressure drop from one end of the torque tube to the other, in the direction from the torque plate assembly 10 towards the reaction flange 7 created by the air extractor means, (not shown) cooling air is drawn into the hollow keys through the holes 63 nearer to the torque plate 10 and exits through the holes 63 nearer to the reaction flange 7.

It is clear that the inlet bores 17 in the arrangement shown in FIGS. 5 and 6 may be combined with the bores 63 in the arrangement shown in FIGS. 7 and 8.

The outlet bores 64 of FIGS. 5 and 6 are more suitable with the embodiments of FIGS. 3 and 4 than of FIGS. 1 and 2 because for strength reasons it is preferable to avoid including both apertures 56 and bores 64 in close proximity at the end of the torque tube.

Figure 9:
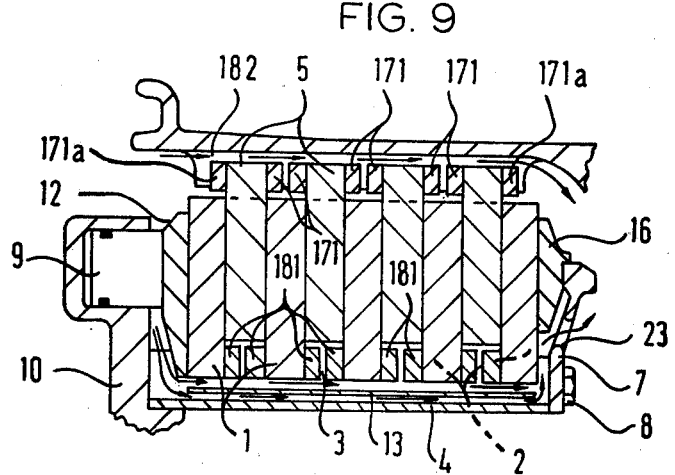
FIG. 9 is a view similar to FIG. 1 of yet another embodiment of the invention.

FIG. 9 is a view similar to FIG. 1 of another embodiment of an aircraft multi-plate wheel disc brake in which like parts have been given like reference numerals, detailed description of the embodiment of FIG. 9 being redundant except with regard to the differences from the embodiment of FIG. 1.

In the embodiment of FIG. 9 the reaction flange 7 is provided intermediate its inner and outer peripheries with a series of circumferentially-spaced slots or apertures 23. Between each adjacent pair of keys 3 a heat shield member 13 extends from end-to-end of the disc pack in spaced relation to the torque tube 4, but does not extend to the hub 10 or the the reaction flange 7. Since air can pass between the hub 10 and each shield 13 the apertures 17 are dispensed with, and since air can pass between each shield 13 and the flange 7 the apertures 56 or recesses 60 are dispensed with.

The brake is of the kind described in U.S. Pat. No. 3,892,293 and is also provided with two series of circumferentially-spaced filler pieces 171 and 181 disposed in the free spaces adjacent the outer end inner peripheries of the disc pack between the radially outwardly or inwardly projecting torque-transmitting portions of alternate discs. Radially outer filler pieces 171 are disposed in circumferentially-spaced positions between the rotor mounting keys 182 intermediate the torque-transmitting outer peripheral portions of the rotors which project radially outwardly beyond the stators, while inner pieces 181 are disposed between the stator mounting keys 3 intermediate the torque-transmitting inner peripheral portions of the stators which project radially inwardly beyond the rotors.

These filler pieces reduce to a relatively small volume the free spaces within the disc pack adjacent the peripheries of the disc which would otherwise be occupied by air, thus reducing the rate of oxidation of the discs in the vicinity of the torque-transmitting keyways.

In the construction shown in FIG. 9 the filler pieces extending adjacent the inner periphery of each rotor and the outer periphery of all but the outermost stators are arranged in axially aligned pairs and are bonded, pegged or otherwise secured to the rotors and stators intermediate the mounting keys. The outer faces of the two outermost rotors are provided with filler pieces 171a in order to standardize the rotor constructions and avoid the necessity for special outer rotors with filler pieces only on their inner sides.

When using the kind of arrangement, shown in FIG. 9 in which the filler pieces are arranged in axially aligned pairs the total thickness of each pair of filler pieces must be such that the pairs of filler pieces will not contact each other when the brake is applied until the discs have worn down to their design limit thickness. Alternatively the filler pieces must be made from a crushable material which is progessively reduced in thickness as the discs wear down.

If desired the filler pieces can be arranged to become part of the heat sink of the brake and assist in dissipation of the heat from those parts of the discs which are particularly susceptible to oxidation by being formed from a high heat capacity material such as for example scrap reinforced carbon disc material or alternatively from any other suitable material such as high density unreinforced graphite.

When made from carbon the filler pieces can be either arranged to resist oxidation, and thus last the full life of the discs by being formed, for example, from a high density carbon, or alternatively they can be arranged to be sacrificial components which are made for example from low density carbon and which are intended to be replaced at least once during the life of the discs.

Alternatively, the filler pieces can be arranged to protect the remainder of the brake from the heat generated in the disc pack by being formed from a heat insulating material such as an asbestos or ceramic-based heat insulator.

In the arrangement of FIG. 9 air is passed between the disc pack and the torque tube 4 on both sides of each shield member 13 in the direction of the arrows and exits through the slots 23. This is achieved either by forcing air from the region of the hub 10 or by producing a subpassage at the reaction flange end of the assembly by means of the fan formerly described.

It will be seen that air flowing between the disc pack and the torque tube 4 is divided by the heat shield members 13 so that part of the air flow is isolated from the disc pack to reduce oxidation. Filler pieces 181 serve to inhibit oxidation by the remainder of the air passing the radially inner peripheries of the discs.

Having now described our invention, what we claim is:

1. In a wheel and disc brake assembly including a wheel rotatably mounted on an axle, a torque tube fixed relative to the axle and having a plurality of keys or tenons extending longitudinally of the tube in circumferentially spaced relation, a plurality of interleaved annular stator and rotor discs forming a disc pack of which the stator discs engage the keys or tenons of the torque tube at their inner peripheries to be axially displaceable but non-rotatable relative to the torque tube and the rotor discs are keyed to the wheel to be rotatable therewith and axially displaceable relative thereto, reaction means at one end of the disc pack and thrust applying means at the other end of the disc pack whereby the discs may be axially displaced into frictional engagement to apply the brake, and heat shield means extending between each adjacent pair of keys or tenons of the torque tube between the radially inner periphery of the disc pack and the torque tube and in spaced relation to the latter, the improvement that said heat shield means extends longitudinally of the torque tube into contact with a fixed mounting for the thrust-applying means at one end and with the reaction means at its other end to form therewith an air passage between each adjacent pair of keys or tenons of the torque tube which is isolated from the disc pack and through which a force draught of cooling air can be passed to remove heat radiated to the heat shield means from the disc pack, and that the mounting for the thrust-applying means and one of the torque tube and the reaction means are suitably apertured near to the opposite ends of each said passage for the entry and exit of the cooling air.

2. A wheel and disc brake assembly as claimed in claim 1, wherein said heat shield means is of sheet metal.

3. A wheel and disc assembly as claimed in claim 1, wherein the heat shield means is of ceramic material.

4. A wheel and disc brake assembly as claimed in claim 1, wherein the heat shield means is of carbon fibre reinforced carbon material.

5. A wheel and disc brake assembly as claimed in claim 1, wherein each key or tenon of the torque tube is hollow and has bores penetrating its lateral sides for the entry of cooling air from said passages, the torque tube having apertures at its end nearest the reaction flange which respectively communicate with the keys or tenons for the exit of cooling air therefrom.

6. A wheel and disc brake assembly as claimed in claim 1, wherein a disc portion of the wheel has angularly spaced apertures through which negative air pressure may be applied to produce a forced draught of cooling air both between the inner periphery of the disc pack and the torque tube and between the outer periphery of the disc pack and a wheel rim and comprising sheet metal heat shield members extending between the keys or tenons of the wheel rim between the outer periphery of the disc pack and the wheel rim and in spaced relation to the latter to protect the wheel rim from heat radiated by the disc pack and provide passages for cooling air which are separated from the disc pack.

7. A wheel and disc assembly as claimed in claim 6, further comprising means at the cooling air entry end of the assembly to reduce the amount of indrawn cooling air which would otherwise pass between the outer periphery of the disc pack and the associated heat shield means and cause at least most of the air to pass between the latter means and the wheel rim.

8. In a wheel and disc brake assembly including a wheel rotatably mounted on an axle, a torque tube fixed relative to the axle and having a plurality of keys or tenons extending longitudinally of the tube in circumferentially spaced relation, a plurality of interleaved annular stator and rotor discs forming a disc pack of which the stator discs engage the keys or tenons of the torque tube at their inner peripheries to be axially displaceable but non-rotatable relative to the torque tube and the rotor discs are keyed to the wheel to be rotatable therewith and axially displaceable relative thereto, reaction means at one end of the disc pack and thrust applying means at the other end of the disc pack whereby the discs may be axially displaced into frictional engagement to apply the brake, and heat shield means extending between each adjacent pair of keys or tenons of the torque tube between the radially inner periphery of the disc pack and the torque tube and in spaced relation to the latter, the improvement that said heat shield means extends longitudinally of the torque tube into contact with a fixed mounting for the thrust-applying means at one end and with the reaction means at its other end to form therewith an air passage between each adjacent pair of keys or tenons of the torque tube which is isolated from the disc pack and through which a forced draught of cooling air can be passed to remove heat radiated to the heat shield means from the disc pack, and that the mounting for the thrust-applying means and the torque tube are suitably apertured near to the opposite ends of each said passage for the entry and exit of the cooling air, said torque tube being apertured in a portion thereof near the reaction means.

9. In a wheel and disc brake assembly including a wheel rotatably mounted on an axle, a torque tube fixed relative to the axle and having a plurality of keys or tenons extending longitudinally of the tube in circumferentially spaced relation, a plurality of interleaved annular stator and rotor discs forming a disc pack of which the stator discs engage the keys or tenons of the torque tube at their inner peripheries to be axially displaceable but non-rotatable relative to the torque tube and the rotor discs are keyed to the wheel to be rotatable therewith and axially displaceable relative thereto, reaction means at one end of the disc pack and thrust applying means at the other end of the disc pack whereby the discs may be axially displaced into frictional engagement to apply the brake, and heat shield means extending between each adjacent pair of keys or tenons of the torque tube between the radially inner periphery of the disc pack and the torque tube and in spaced relation to the latter, the improvement that said heat shield means extends longitudinally of the torque tube into contact with a fixed mounting for the thrust-applying means at one end and with the reaction means at its other end to form therewith an air passage between each adjacent pair of keys or tenons of the torque tube which is isolated from the disc pack and through which a forced draught of cooling air can be passed to remove heat radiated to the heat shield means from the disc pack, and that the mounting for the thrust-applying means and the reaction means are suitably apertured near to the opposite ends of each said passage for the entry and exit of the cooling air.

* * * * *